United States Patent
Laux et al.

(10) Patent No.: US 7,783,284 B1
(45) Date of Patent: Aug. 24, 2010

(54) METHOD AND APPARATUS FOR SITE ADMINISTRATION AT A WIRELESS HANDSET

(75) Inventors: Carlos V. Laux, San Ramon, CA (US); Kamaldip Toor, San Diego, CA (US); Marcio G. de Siqueira, San Jose, CA (US); Sudhakar S. Valluru, San Jose, CA (US); Steven Hayashi, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1612 days.

(21) Appl. No.: 10/293,375

(22) Filed: Nov. 12, 2002

(51) Int. Cl.
*H04B 17/00* (2006.01)

(52) U.S. Cl. ............... 455/418; 455/411; 455/423; 455/428; 455/457

(58) Field of Classification Search .......... 455/411, 455/418, 423–425, 426.1, 428, 434, 457
See application file for complete search history.

(56) References Cited

U.S. PATENT DOCUMENTS

| | | | |
|---|---|---|---|
| 6,269,086 B1 | 7/2001 | Magana et al. ............ 370/280 |
| 6,269,395 B1 * | 7/2001 | Blatherwick et al. ....... 709/219 |
| 6,330,244 B1 | 12/2001 | Swartz et al. ............ 370/401 |
| 6,671,510 B1 * | 12/2003 | Kelly et al. ............. 455/445 |
| 6,870,822 B2 * | 3/2005 | Balogh ................. 370/332 |
| 7,162,507 B2 * | 1/2007 | Carter ................. 709/200 |
| 2003/0114153 A1 * | 6/2003 | Shaver et al. ............ 455/424 |
| 2004/0198319 A1 * | 10/2004 | Whelan et al. ............ 455/411 |

* cited by examiner

*Primary Examiner*—Yuwen Pan
(74) *Attorney, Agent, or Firm*—Baker Botts L.L.P.

(57) ABSTRACT

A method for site administration includes receiving a user's instruction to invoke a tool at a wireless handset. The method also includes invoking execution of the tool at the wireless handset. The tool is operable to identify at least one characteristic of at least one access point in a communication system and to display the at least one characteristic associated with the at least one access point to the user at the handset.

25 Claims, 5 Drawing Sheets

FIG. 4C

| INDEX | CHANNEL | SSID | BSSID |
|-------|---------|------|-------|
| 1 | $CN_1$ | $SSID_1$ | $BSSID_1$ |
| 2 | $CN_2$ | $SSID_2$ | $BSSID_2$ |
| 3 | $CN_3$ | $SSID_3$ | $BSSID_3$ |
| 4 | $CN_4$ | $SSID_4$ | $BSSID_4$ |

FIG. 4D

INDEX: 1
RSSI: $RSSI_1$   CHANNEL: $CN_1$
PPM: $PPM_1$   SSID: $SSID_1$
BU: $BU_1$   BSSID: $BSSID_1$
QBSS: $QBSS_1$

FIG. 5

| INDEX | COMPONENT | ADDRESS |
|-------|-----------|---------|
| 1 | CURRENT AP | $IP_1$ |
| 2 | SWITCH 1 | $IP_2$ |
| 3 | SWITCH 2 | $IP_3$ |
| 4 | DESTINATION | $IP_4$ |

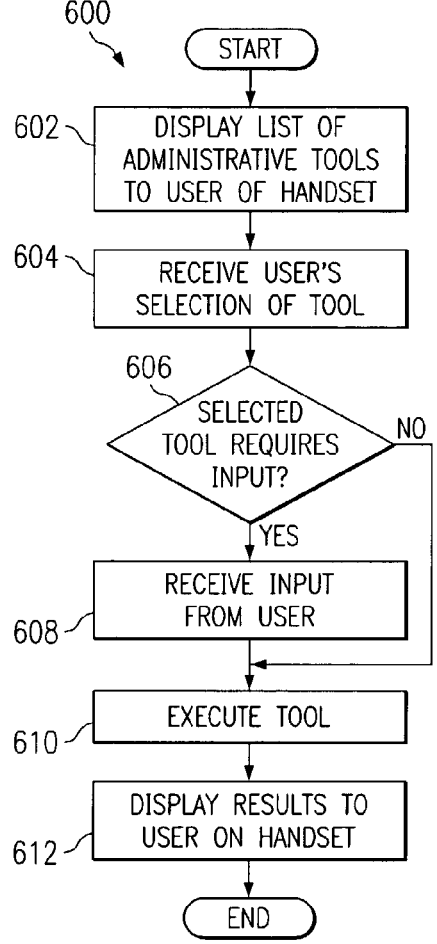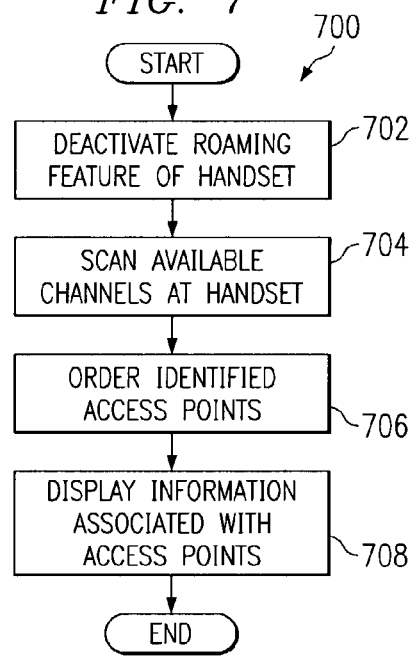

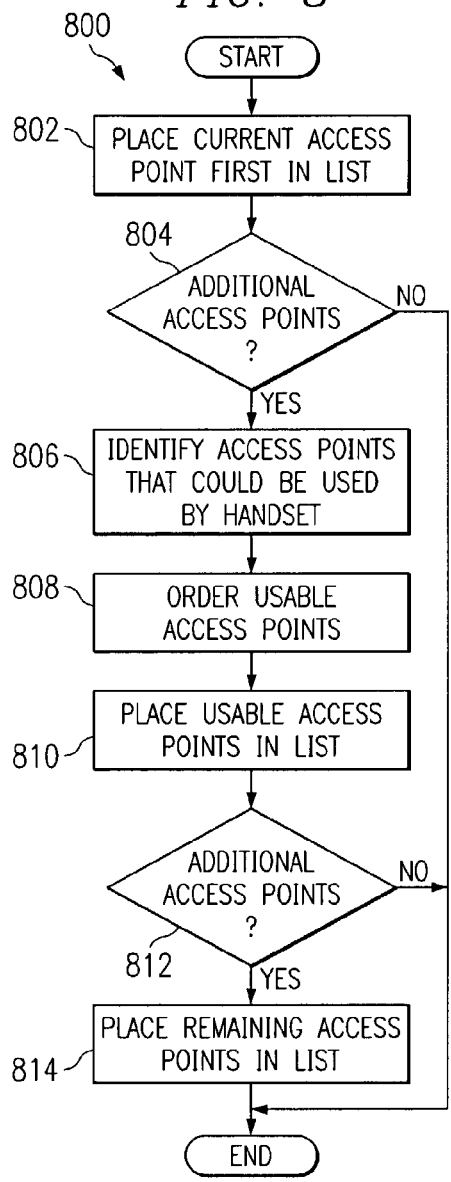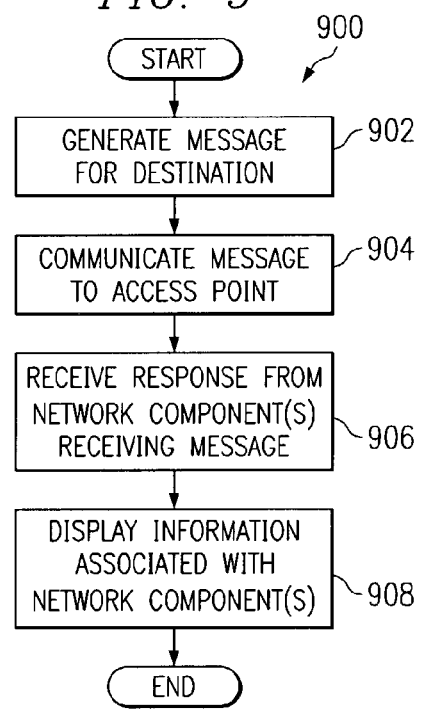

METHOD AND APPARATUS FOR SITE ADMINISTRATION AT A WIRELESS HANDSET

TECHNICAL FIELD

This disclosure relates generally to communication systems, and more particularly to a method and apparatus for site administration at a wireless handset.

BACKGROUND

A typical communication network allows wireless devices, such as mobile telephones, to communicate with the network. Each wireless device can typically participate in at least one communication session, such as a telephone call. During the communication session, information from the wireless device often travels through various components of the network. Each wireless device can also typically communicate with different network components. For example, a wireless device could be able to communicate with different network components over different communication channels.

SUMMARY

This disclosure describes a method and apparatus for site administration at a wireless handset.

In one embodiment, a method for site administration includes receiving a user's instruction to invoke a tool at a wireless handset. The method also includes invoking execution of the tool at the wireless handset. The tool is operable to identify at least one characteristic of at least one access point in a communication system and to display the at least one characteristic associated with the at least one access point to the user at the handset.

In a particular embodiment, the tool represents a survey tool that is operable to identify at least one characteristic of at least one access point detected at the handset. In another particular embodiment, the tool represents a trace tool operable to identify a route through the communication system traveled by a message communicated from the wireless handset.

One or more technical advantages may be provided according to various embodiments of this disclosure. Particular embodiments of this disclosure may exhibit none, some, or all of the following advantages depending on the implementation. For example, in one embodiment, a handset may include one or more administrative tools that can be used to gather information about a communication system. As one example, a tool may gather and display information about any access points detected by the handset. This tool could also sort the information about the access points. As another example, a tool may gather and display information about the route that information from the handset takes through the communication system. By allowing the handset to collect information about the communication system, the user may use the information to administer the system. For example, the user could use the information to identify locations where the handset cannot receive adequate service. Also, by providing the tools in the handset, the user may not need to use a separate device to collect the information.

Other technical advantages will be readily apparent to one skilled in the art from the following figures, descriptions, and claims.

BRIEF DESCRIPTION OF THE DRAWINGS

For a more complete understanding of this disclosure and its advantages, reference is now made to the following description, taken in conjunction with the accompanying drawings, in which:

FIG. 3 illustrates an example display listing administrative tools available at a handset;

FIGS. 4A through 4D illustrate example displays identifying characteristics of access points in a communication system;

FIG. 5 illustrates an example display identifying a route used to transport information from a handset;

FIG. 6 illustrates an example method for site administration at a handset;

FIG. 7 illustrates an example method for surveying components in a communication system;

FIG. 8 illustrates an example method for ordering surveyed access points in a communication system; and FIG. 9 illustrates an example method for tracing a route used to transport information from a handset.

DETAILED DESCRIPTION OF EXAMPLE EMBODIMENTS

Figure 1:
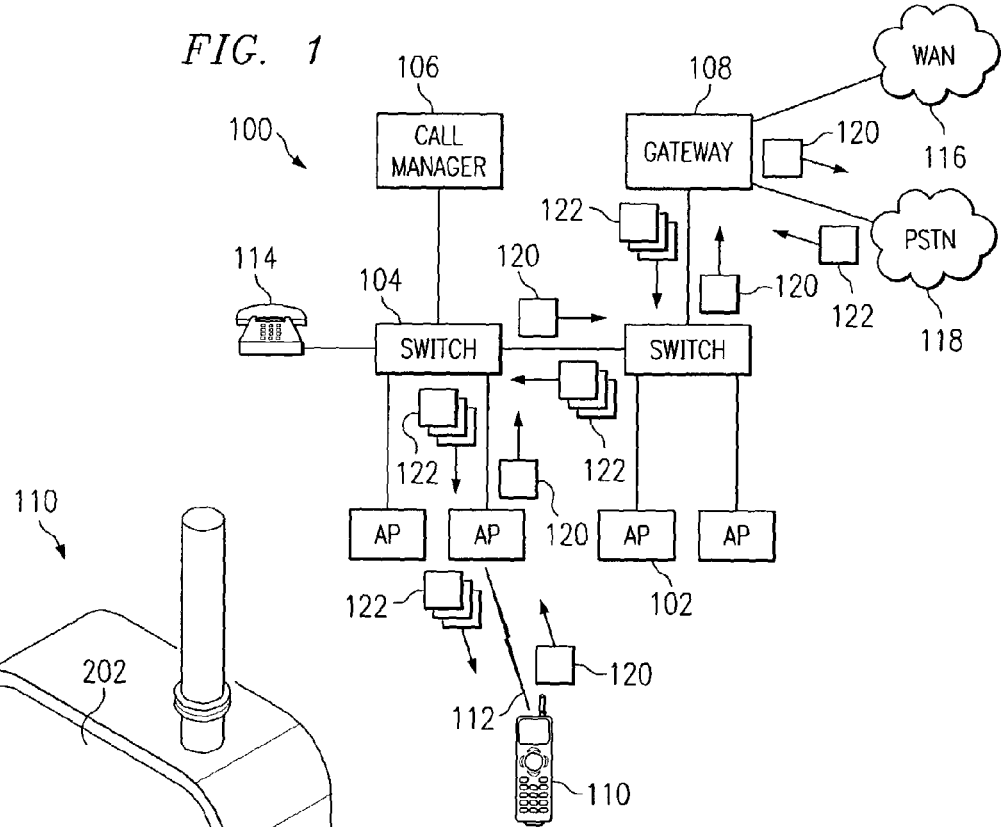
FIG. 1 illustrates an example communication system.

FIG. 1 illustrates an example communication system 100. In the illustrated example, system 100 includes access points (APs) 102, switches 104, a call manager 106, and a gateway 108. Other embodiments of system 100 may be used without departing from the scope of this disclosure.

In one aspect of operation, a handset 110 may communicate with one or more access points 102 and receive service in system 100. Handset 110 may include one or more administrative tools. The tools may be used to gather information about system 100. For example, one tool may gather information about access points 102 that can be detected by handset 110, such as by measuring the strength of signals received from the access points 102. Another tool may gather information about the route that information from handset 110 takes through system 100, such as by tracing the route through access points 102 and switches 104. The collected information can then be provided to a user of handset 110, and the user can use the information in any suitable manner. For example, the user could identify locations where handset 110 cannot receive adequate service from access points 102 or identify the shortest path to a particular destination. As a particular example, a network administrator or network engineer could use handset 110 to identify various characteristics of the system 100.

In the illustrated embodiment, access point 102 is coupled to a switch 104. In this specification, the term "couple" refers to any direct or indirect communication between two or more components, whether or not those components are in physical contact. Access point 102 communicates with one or more handsets 110 over or more communication channels 112. For example, access point 102 may establish a communication session for a handset 110. The communication session could include a voice telephone call, a facsimile or data transmission, or any other suitable communication session. In one embodiment, access point 102 communicates with handsets 110 using one or more Institute of Electrical and Electronics Engineers (IEEE) 802.11 protocols. As particular examples, access point 102 could communicate with a handset 110 using the 802.11a, 802.11b, or 802.11g protocols. Access point 102 may include any hardware, software, firmware, or combination thereof operable to communicate with one or more handsets 110.

Handset 110 communicates with an access point 102 over a communication channel 112. A user using handset 110 may roam within system 100, and handset 110 may stop using one access point 102 and begin using another access point 102. In this example, handset 110 represents a mobile telephone, such as an IEEE 802.11 mobile telephone supporting voice services. In various portions of this specification, system 100 may be described as handling voice calls to and from handsets 110. System 100 could also allow handsets 110 to transmit and receive other types of traffic, such as facsimile traffic and data traffic.

In the illustrated embodiment, each switch 104 is coupled to multiple access points 102 and to another switch 104. Each switch 104 may also be coupled to additional components of system 100, such as to call manager 106, gateway 108, or one or more packet-switched telephones 114. Switch 104 facilitates communication between the various components of system 100. For example, switch 104 may allow an access point 102 to communicate with call manager 106. Switch 104 could also allow two access points 102 to communicate with one another and establish a communication session between two handsets 110. Switch 104 may include any hardware, software, firmware, or combination thereof for facilitating communication between components of system 100.

In the illustrated embodiment, call manager 106 is coupled to a switch 104. Call manager 106 facilitates the routing of information to and from handsets 110 in system 100. For example, call manager 106 may track the location of a handset 110 in system 100. Call manager 106 may then inform an access point 102, switch 104, or gateway 108 where to route an incoming telephone call or message for handset 110. This may allow, for example, the user of a handset 110 to move or roam within system 100 and still receive incoming calls or messages. The roaming may or may not occur while a communication session is established with the handset 110. Call manager 106 may include any hardware, software, firmware, or combination thereof for facilitating the routing of information to and from handsets 110 in system 100

In the illustrated embodiment, gateway 108 is coupled to a switch 104 and one or more external networks, such as a wide area network (WAN) 116 and a public switched telephone network (PSTN) 118. Gateway 108 transfers information between system 100 and the external networks. For example, gateway 108 may receive datagrams containing voice information from a handset 110, and gateway 108 may communicate the datagrams to the external network. A datagram may represent an Internet Protocol (IP) packet, a frame relay frame, an Asynchronous Transfer Mode (ATM) cell, or any other suitable segment of information. Gateway 108 may also perform a conversion function to translate information between various formats and protocols. As an example, gateway 108 may communicate with switch 104 using a packet-switched format and with PSTN 118 using a circuit-switched format. In this example, gateway 108 may convert information from switch 104 into a suitable circuit-switched format for communication to PSTN 118. Gateway 108 may also convert information received from PSTN 118 into a packet-switched format for communication to switch 104. Gateway 108 may include any hardware, software, firmware, or combination thereof for facilitating communication with one or more external networks.

In one aspect of operation, a survey tool executed by handset 110 may detect one or more access points 102 in system 100. For example, handset 110 may receive signals from the access points 102, and the survey tool may use the signals to identify the various access points 102. The survey tool may also identify various characteristics associated with the detected access points 102. In one embodiment, handset 110 may monitor the strength of a signal received from access point 102 and the load placed on a channel 112 used by the access point 102. In a particular embodiment, handset 110 may receive a signal from access point 102 and generate a Received Signal Strength Indication (RSSI) value, which identifies the strength of the signal received from access point 102. Also, in a particular embodiment, access point 102 broadcasts a beacon that identifies the load placed on channel 112, and handset 110 receives the signal and identifies the load. The broadcast signal could, for example, include one or more Quality of service Basic Service Set (QBSS) signals identifying the load. The signal identifying the load may or may not be the same signal used by handset 110 to identify the signal strength. In addition, the survey tool may display the collected information about the access points 102 to a user. For example, the survey tool could display the identity of each detected access point 102, the signal strength associated with each access point 102, and the load placed on the channel 112 associated with access point 102.

In one embodiment, the survey tool may also sort the displayed information. For example, the survey tool may sort the order in which the access points 102 are displayed. In a particular embodiment, the first access point 102 displayed may represent the current access point 102 being used by handset 110. If handset 110 identifies any access points 102 that could be used to support a communication session, these access points 102 may follow the current access point 102. Any remaining access points 102 could then follow the usable access points 102.

The use of survey tool may, for example, allow a network engineer or other personnel to identify the range of access points 102 in system 100. For example, a network engineer could use handset 110 to display information about a particular access point 102. The network engineer may move handset 110 and identify where handset 110 loses contact with the access point 102 or where the signal strength falls below a particular level. The transmission power used by the access point 102 to transmit signals to handset 110 could also be varied to identify different effective ranges of the access point 102. In addition, the ranges of multiple access points 102 could be determined and used to identify areas where signals from multiple access points 102 overlap.

In another aspect of operation, a trace tool executed by handset 110 may gather and display information about the route that information from handset 110 takes through system 100. As an example, handset 110 may generate and communicate a message 120 to a destination. In a particular embodiment, message 120 represents an Internet Control Message Protocol (ICMP) message, and the destination represents a device at a particular Internet Protocol (IP) address. As the message 120 passes through system 100, each component receiving message 120 may generate and communicate a response 122 to handset 110. The response 122 identifies the component of system 100 that received message 120. Handset 110 may receive responses 122 from the system components, extract the identities of the system components that received message 120, and display the information to the user.

The user using handset 110 to perform the administrative function or functions described above could represent any suitable user. For example, a network administrator, a network engineer, an end user, or any other suitable user could use handset 110.

Although FIG. 1 illustrates one example of a communication system 100, various changes may be made to system 100. For example, system 100 may include any suitable number of access points 102, switches 104, call managers 106, gateways 108, and handsets 110. Also, each switch 104 may be coupled to any suitable number of access points 102, and each access point 102 may serve any suitable number of handsets 110. Further, while gateway 108 is shown as providing access to a WAN 116 and a PSTN 118, gateway 108 could provide access to any other or additional external network or networks. In addition, while FIG. 1 illustrates one example operational environment in which a handset 110 can operate, handset 110 could function in other operational environments.

Figure 2:
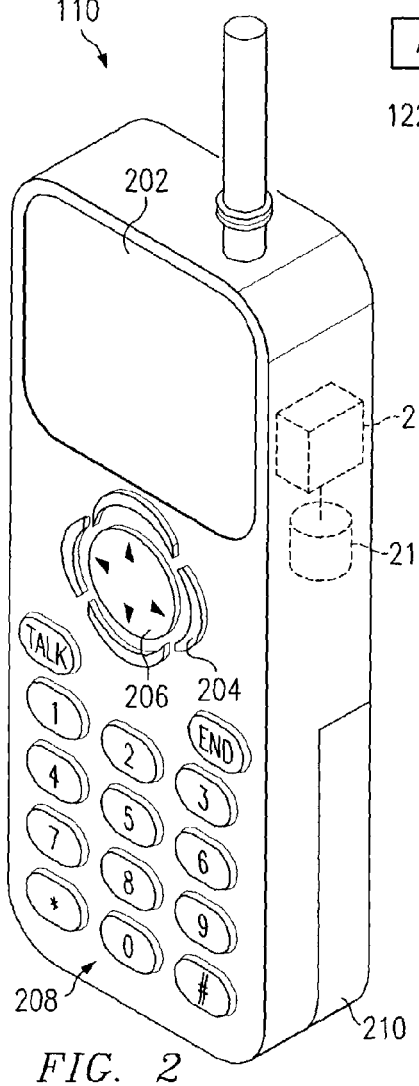
FIG. 2 illustrates an example handset.

FIG. 2 illustrates an example handset 110. In the illustrated example, handset 110 includes visible components, such as a display screen 202, a navigation button 204, buttons 206, a keypad 208, and a power supply 210. Handset 110 also includes internal components, such as a processor 212 and a memory 214. Other embodiments of handset 110 could be used in system 100 without departing from the scope of this disclosure.

Display screen 202 represents any suitable interface for visually presenting information. For example, display screen 202 may include a liquid crystal display (LCD). Within display screen 202, handset 110 can display information to a user, such as caller identification information associated with an incoming telephone call or the number being dialed by the user. Display screen 202 may represent any suitable structure for displaying information.

Navigation button 204 permits a user to indicate up, down, right, and left movements. For example, handset 110 could display a menu in display screen 202, and navigation button 204 allows the user to navigate the menu and select an option in the menu. Similarly, buttons 206 could permit a user to navigate up, down, right, and left in a menu or other display. Buttons 206 could also represent other functions available to be invoked by the user. For example, buttons 206 could allow the user to activate a menu, exit a menu, or activate a web surfing application. Keypad 208 permits traditional numeric and special character entry by a user. Navigation button 204, buttons 206, and keypad 208 could include or otherwise represent any suitable structure or structures for that can be depressed or otherwise selected by a user.

This embodiment illustrates a particular configuration of a specific display screen 202 and input mechanisms 204-208 for interacting with a user. Other handsets 110 may include other or additional display mechanisms, input mechanisms, types of mechanisms, and configurations than are shown.

Power supply 210 supplies operating power to handset 110. Power supply 210 could represent any suitable source or sources of power for handset 110. Power supply 210 could, for example, include a lithium-ion or other battery, a solar cell, a fuel cell, or any other or additional source of power.

Processor 212 represents one or more processors, programmed logic devices, or other suitable processing equipment for managing the operation of handset 110. Memory 214 may store information used by processor 212, such as instructions executed by processor 212 and data processed by processor 212. Memory 214 may represent any suitable device or devices for storing information using any of a variety of data structures, arrangements, or compilations.

In one aspect of operation, processor 212 may execute or otherwise support a survey tool in handset 110. The survey tool may identify one or more access points 102 in system 100 and various characteristics of those access points 102. For example, processor 212 may identify the load on a channel 112 used by an access point 102 and the strength of a signal received from access point 102. Processor 212 may then display the identity of the access points 102 and the collected information about the access points 102 to a user through display screen 202. Processor 212 could further order the identified access points 102 that are displayed to the user. For example, processor 212 could first list the access point 102 currently serving handset 110, followed by access points 102 that could be used by handset 110 and access points 102 that could not be used by access point 102.

In another aspect of operation, processor 212 may execute or otherwise support a trace tool in handset 110. The trace tool allows handset 110 to track how information is routed in system 100. For example, processor 212 could generate a message 120 and communicate the message 120 to the access point 102 serving handset 110. Processor 212 could also receive responses 122 from one or more components of system 100 that receive message 120 and identify the system components using responses 122. Processor 212 could then display the identities of the system components to the user through display screen 202.

Although FIG. 2 illustrates one example of a handset 110, various changes may be made to handset 110. For example, handset 110 could include any suitable buttons to navigate display screen 202. Also, other or additional buttons can be used in handset 110. In addition, any other suitable handset 110 can be used in system 100.

Figures 3, 4A, 4B:
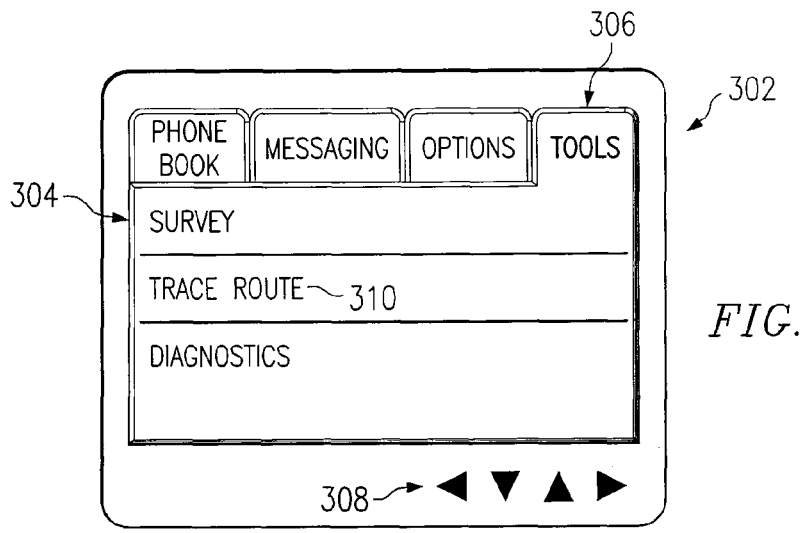

FIG. 3 illustrates an example display 302 listing administrative tools available at a handset. Display 302 could, for example, appear on display screen 202 of handset 110. In the illustrated embodiment, display 302 identifies various tools 304 listed in a folder system 306.

In the illustrated example, three tools 304 are displayed to the user. The tools 304 include a survey tool, a trace tool, and a diagnostics tool. Other or additional tools 304 could be displayed to a user and supported by handset 110. Selection of the survey tool 304 causes handset 110 to survey access points 102 that can be detected by handset 110. Selection of the trace tool 304 causes handset 110 to generate a trace message 120 and display components of system 100 that received message 120.

Tools 304 are listed in a tools folder of folder system 306. Folder system 306 helps to separate selections available to the user into different groups. In this example, the folder system 306 includes a phone book folder, a messaging folder, an options folder, and the tools folder. Other or additional folders could be used in handset 110. Also, other mechanisms other than a folder system can be used in handset 110 to list functions available to the user, such as a menu system.

In this embodiment, display 302 includes navigation indicators 308. Indicators 308 tell the user of handset 110 which way or ways the user can navigate in display 302. For example, the indicators 308 pointing right and left could inform the user that different folders in folder system 306 can be selected using the right and left portions of navigation button 204 or the right and left buttons 206. The indicators 308 pointing up and down could inform the user that different functions 304 can be selected in display 302 using the top and bottom portions of navigation button 204 or the up and down buttons 206. In this example, the function 304 that can be invoked is highlighted using a background color or shading 310.

In one embodiment, handset 110 may limit access to administrative tools 304. For example, handset 110 could display a list of tools 304 when the user enters an administrative code, such as when the list is kept in a hidden menu. This may, for example, limit access to the administrative tools 304 by ordinary users.

Although FIG. 3 illustrates one example of a display 302 listing administrative tools available at a handset 110, various changes may be made to display 302. For example, any other display or displays could be used to present the information from FIG. 3 to the user.

FIGS. 4A through 4D illustrate example displays 402a-402d identifying characteristics of access points 102 in communication system 100. Displays 402 could, for example, appear on display screen 202 of handset 110 after the survey tool 304 is selected by the user in display 302. In the illustrated embodiment, displays 402 include information about one or more access points 102 in system 100.

In the illustrated example, display 402*a* includes entries 404 each including an index number 406, an access point identifier 408, and a signal strength 410. Index numbers 406 represent a mechanism to index the various access points 102 identified in display 402*a*. In one embodiment, each access point 102 identified in display 402*a* has a unique index number 406. Access point identifiers 408 identify the access points 102 detected by handset 110. Access point identifiers 408 could represent any suitable identifiers, such as alphanumeric strings. Signal strengths 410 identify the strengths of signals received from the detected access points 102. Signal strengths 410 may, for example, represent RSSI values, although other signal strength representations could be used.

In one aspect of operation, processor 212 detects signals from access points 102, such as by detecting the beacons from access points 102. The signals from access points 102 may identify the access points 102, and processor 212 may determine the strengths of the signals received from access points 102. Processor 212 may then display this information in display 402*a*.

In one embodiment, processor 212 may sort the order in which access points 102 are displayed. In the illustrated embodiment, the first access point 102 listed in display 402*a* represents the current access point 102 used by handset 110. The next two access points 102 listed in display 402*a* represent access points 102 that could be used by handset 110. For example, these usable access points 102 may have a signal strength that could support a communication session involving handset 110. These usable access points 102 could also use the same Service Set Identifier (SSID) and authentication type as handset 110. These access points 102 could be listed in order of decreasing signal strength 410 or in any other suitable order. After the usable access points 102, processor 212 could display any other detected access points 102. These access points 102 could represent access points 102 having a signal strength 410 that is too low to support a communication session with handset 110. These access points 102 could also represent access points 102 that the handset 110 cannot use to establish a communication session, such as access points 102 that use different SSIDs and/or authentication types than handset 110. The number of usable and other access points 102 in display 402*a* is for illustration only.

Navigation indicators 412 identify how the user can navigate display 402*a*. For example, the indicator 412 pointing down could indicate that the user can scroll down to view additional entries 404. The indicator 412 pointing right could indicate that the user can view additional information about the displayed access points 102.

FIG. 4B illustrates a display 402*b* that could be shown when the user presses the right portion of navigation button 204 or the right button 206 in display 402*a*. In FIG. 4B, display 402*b* includes additional information about access points 102. In this example, each entry 404 includes index numbers 406, a packets per minute (PPM) value 414, a bandwidth utilization (BU) value 416, and a load value 418.

The packets per minute value 414 identifies the number of packets or other datagrams that an access point 102 is processing in system 100. The bandwidth utilization value 416 identifies the percentage of possible throughput of a channel 112 that is currently being used by an access point 102 and all the handsets 110 served by that access point 102. The load value 418 identifies the load placed on a channel 112. Load values 418 may, for example, represent QBSS values, although other load representations could be used. The packets per minute values 414, bandwidth utilization values 416, and load values 418 could be determined using the beacons or other signals received from access points 102 or in any other suitable manner.

Navigation indicators 420 identify how the user can navigate display 402*b*. For example, the indicator 420 pointing down could indicate that the user can scroll down to view additional entries 404. The indicator 420 pointing left could indicate that the user can return to display 402*a*. The indicator 420 pointing right could indicate that the user can view additional information about the displayed access points 102.

FIG. 4C illustrates a display 402*c* that could be shown when the user presses the right portion of navigation button 204 or the right button 206 in display 402*b*. In FIG. 4C, display 402*c* includes additional information about access points 102. In this example, each entry 404 includes channel numbers 422, SSID values 424, and Basic Service Set Identifier (BSSID) values 426.

The channel number 422 identifies the channel number associated with a communication channel 112 used by an access point 102. The SSID value 424 identifies the SSID associated with an access point 102, and the BSSID value 426 identifies the BSSID associated with an access point 102. The channel numbers 422, SSID values 424, and BSSID values 426 could be determined using the beacons or other signals received from access points 102 or in any other suitable manner.

Navigation indicators 428 identify how the user can navigate display 402*c*. For example, the indicator 428 pointing down could indicate that the user can scroll down to view additional entries 404. The indicator 412 pointing left could indicate that the user can return to display 402*b*.

FIGS. 4A through 4C show one mechanism that handset 110 can use to display information about multiple access points 102. Instead of or in addition to the mechanism shown in FIGS. 4A through 4C, another mechanism can be used to display information about a specific access point 102. In this embodiment, FIG. 4A can be used to display a list of detected access points 102. The user can then select one of the displayed entries 404, and display 402*d* from FIG. 4D can be presented to the user. Display 402*d* contains information about the selected access point 102, including the signal strength value 410, load 418, and SSID 424 for that particular access point 102. Navigation indicator 430 indicates that the user can return to display 402*a* using the left portion of navigation button 204 or the left button 206. The use of display 402*d* allows the user to view a consolidated display of the information for a particular access point 102.

In a particular embodiment, a handset 110 may allow the user to deactivate a handoff or roaming feature of the handset 110. The handoff/roaming feature allows handset 110 to communicate with different access points 102 as handset 110 moves in system 100. For example, handset 110 may initiate a handoff when the signal strength 410 associated with the current access point 102 serving handset 110 drops below a threshold level. By deactivating the handoff/roaming capability, handset 110 attempts to maintain communication with the same access point 102, even when the signal strength 410 falls below the threshold. This may help to keep handset 110 from constantly updating the order of the access points 102 in displays 402*a*-402*c*. This may also help the user to identify locations where signals from the current access point 102 cannot reach, such as places where the signal strength 410 of the current access point 102 falls below another threshold level or reaches zero.

Although FIGS. 4A through 4D illustrate one example of displays 402 identifying characteristics of access points 102 in communication system 100, various changes may be made to displays 402. For example, the information contained in displays 402 could be arranged in any suitable manner. Also, other or additional information could be included in displays 402. Further, the navigation indicators need not be used in displays 402. In addition, any other suitable displays may be used to present this information to the user.

FIG. 5 illustrates an example display 502 identifying a route used to transport information from a handset. Display 502 could, for example, appear on display screen 202 of handset 110 after the trace tool 304 is selected by the user in display 302. In the illustrated embodiment, display 502 includes information about one or more system components in system 100 used to route information from handset 110 to a destination.

In the illustrated example, display 502 includes entries 504 each including an index number 506, a system component identifier 508, and a network address 510. Index numbers 506 represent a mechanism to index the various system components identified in display 502. In one embodiment, each system component identified in display 502 has a unique index number 506. System component identifiers 508 identify the system components that routed information from handset 110 to a destination. System component identifiers 408 could represent any suitable identifiers, such as alphanumeric strings. Addresses 510 identify the network addresses of the system components listed in display 502. Addresses 510 may, for example, represent IP addresses, although other addresses could be used.

In one aspect of operation, processor 212 initiates a trace in system 100 by generating a message 120 and communicating message 120 to an access point 102. The message 120 causes each component of system 100 that receives message 120 to generate a response 122 and communicate response 122 to handset 110. Processor 212 receives responses 122, identifies the system components that received message 120 using responses 122, and displays the information about the system components.

Navigation indicators 512 identify how the user can navigate display 502. For example, the indicator 512 pointing down could indicate that the user can scroll down to view additional entries 504.

In one embodiment, the user could select an entry 504 in display 502. Handset 110 could then display information about the system component represented by the entry 504. For example, if the system component represented by an entry 504 is an access point 102, selecting the entry 504 could cause handset 110 to present display 402d to the user.

Although FIG. 5 illustrates one example of a display 502 identifying a route used to transport information from a handset 110, various changes may be made to FIG. 5. For example, display 502 could include index numbers 506 and addresses 510 without including system component identifiers 508. Also, the information contained in display 502 could be arranged in any suitable manner, and other or additional information could be included in display 502. Further, the navigation indicators need not be used in displays 502. In addition, any other suitable displays may be used to present this information to the user.

FIG. 6 illustrates an example method 600 for site administration at a handset. Method 600 is described with respect to the handset 110 of FIG. 2 operating in the system 100 of FIG. 1. Method 600 could be used by other handsets and/or in other systems.

Handset 110 displays a list of administrative tools to a user at step 602. This may include, for example, processor 212 generating display 302 of FIG. 3 and presenting the display 302 to the user on display screen 202. This may also include handset 110 requiring the user to enter an authorization code to view the list of administrative tools. Handset 110 receives the user's selection of one of the administrative tools at step 604. This may include, for example, processor 212 allowing the user to navigate display 302 using navigation button 204 or buttons 206.

Handset 110 determines whether the selected tool requires input at step 606. This may include, for example, processor 212 determining whether the selected tool is a survey tool or a trace tool. The survey tool may be able to survey the access points 102 without additional user input, while the trace tool may need the destination of message 120 to perform the trace. If input is needed, handset 110 receives the input from the user at step 608. This may include, for example, the user using keypad 208 to provide an IP or other address of the trace destination.

Handset 110 executes the selected administrative tool at step 610. This may include, for example, handset 110 surveying access points 102 and collecting information about the detected access points 102. This may also include handset 110 generating a trace message 120 and receiving a response 122 from one or more components of system 100. Handset 110 displays the results to the user at step 612. This may include, for example, processor 212 generating displays 402a-402d or display 502 and presenting the generated displays on display screen 202. This may also include processor 212 allowing the user to navigate the displayed results.

Although FIG. 6 illustrates one example of a method 600 for site administration at a handset 110, various changes may be made to method 600. For example, handset 110 could store a default trace destination in memory 214, and handset 110 need not receive input from the user before executing the trace tool.

FIG. 7 illustrates an example method 700 for surveying components in a communication system. Method 700 is described with respect to the handset 110 of FIG. 2 operating in the system 100 of FIG. 1. Method 700 could be used by other handsets and/or in other systems.

Handset 110 deactivates its roaming feature at step 702. This may include, for example, the user selecting a feature of handset 110 to disable the roaming feature. This may also include processor 212 displaying a prompt to the user when the surveying tool 304 is selected asking if the user wishes to deactivate the roaming feature. Handset 110 scans available communication channels 112 at step 704. This may include, for example, processor 212 performing an active scan or a passive scan of a communication channel 112. During a passive scan of a channel 112, handset 110 detects the beacon from an access point 102 and uses the beacon to identify information about the channel 112. During an active scan, handset 110 probes an access point 102 by sending a message to access point 102, and access point 102 responds by sending a message containing information about channel 112 to handset 110.

Handset 110 orders the access points 102 associated with the scanned channels 112 at step 706. This may include, for example, processor 212 using the method illustrated in FIG. 8, which is described below. Handset 110 displays information associated with the access points 102 at step 708. This may include, for example, processor 212 generating displays 402a-402d of FIGS. 4A through 4D. This may also include processor 212 presenting the displays 402a-402d on display screen 202.

Although FIG. 7 illustrates one example of a method 700 for surveying components in a communication system 100, various changes may be made to method 700. For example, while handset 110 is shown as ordering the surveyed access points 102, handset 110 could display information about the access points 102 without ordering the access points 102.

FIG. 8 illustrates an example method 800 for ordering surveyed access points in a communication system. Method 800 is described with respect to the handset 110 of FIG. 2 operating in the system 100 of FIG. 1. Method 800 could be used by other handsets and/or in other systems.

Handset 110 places the current access point 102 first in a list at step 802. Handset 110 determines whether additional access points 102 have been detected at step 804. This may include, for example, processor 212 determining if only the current access point 102 was detected by handset 110. If no more access points 102 have been detected, handset 110 need not order any more access points 102, and method 800 ends. Otherwise, handset 110 identifies any access points 102 that could be used by handset 110 at step 806. This may include, for example, processor 212 determining whether any of the remaining access points 102 use the same SSID and authentication type as handset 110 and have a suitable signal strength. Handset 110 orders the usable access points 102 at step 808. This may include, for example, processor 212 placing the usable access points 102 in order of decreasing signal strength 410 or in any other suitable manner. Handset 110 places the ordered, usable access points 102 in the list at step 810.

Handset 110 determines whether additional access points 102 remain to be processed at step 812. If not, method 800 ends. Otherwise, handset 110 places the remaining unusable access points 102 in the list at step 814. An access point 102 may be unusable because it uses a different SSID or authentication type than the handset 110, the signal strength 410 of that access point 102 is too low, or for any other suitable reason.

Although FIG. 8 illustrates one example of a method 800 for ordering surveyed access points 102 in a communication system 100, various changes may be made to method 800. For example, the access points 102 could be placed in any other order or not placed in order by handset 110.

FIG. 9 illustrates an example method 900 for tracing a route used to transport information from a handset. Method 900 is described with respect to the handset 110 of FIG. 2 operating in the system 100 of FIG. 1. Method 900 could be used by other handsets and/or in other systems.

Handset 110 generates a trace message 120 for a destination at step 902. This may include, for example, processor 212 generating an ICMP message for the destination identified by the user. Handset 110 communicates message 120 to its current access point 102 at step 904. This may include, for example, processor 212 communicating the message 120 over channel 112.

Handset 110 receives one or more responses 122 at step 906. This may include, for example, processor 212 receiving a response 122 from each system component that received message 120. Handset 110 displays information associated with the system components that produced responses 122 at step 908. This may include, for example, processor 212 extracting information about the system components from responses 122. This may also include processor 212 generating display 502 of FIG. 5 and presenting the display 502 to the user through display screen 202.

Although FIG. 9 illustrates one example of a method 900 for tracing a route used to transport information from a handset 110, various changes may be made to method 900. For example, handset 110 could further process and use the responses 122 from the system components in any suitable manner. As a particular example, handset 110 could send multiple trace messages 120 to multiple access points 102 and use the responses 122 to identify the shortest path to the destination.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. At least one non-transitory computer readable medium embodying logic for execution by one or more computer systems, the logic being operable when executed to:
   receive a first instruction initiated by a user to invoke a survey tool at a wireless handset;
   invoke execution of the survey tool, the survey tool being operable when executed to:
      detect a plurality of wireless access points of one or more communication systems;
      identify a plurality of characteristics associated with each of the access points, the identified characteristics for each of the wireless access points comprising a signal strength associated with a communication channel used by the wireless access point and a load placed on the communication channel; and
      display the identified characteristics of at least one of the wireless access points to the user at a display of the wireless handset along with a wireless access point identifier corresponding to the at least one wireless access point
   receive a second instruction initiated by the user to invoke a trace tool at the wireless handset;
   invoke execution of the trace tool at the wireless handset, wherein upon execution of the trace tool, the trace tool is operable to:
      receive an address of a destination;
      generate a message
      cause the message to be communicated to a particular one of the wireless access points, the message being configured to:
         cause the particular one of the wireless access points to route the message to the destination through one or more of the communication systems by way of one or more communication system components; and
         cause each of one or more of the communication system components or the destination to generate and transmit a response that comprises a communication system identifier or a network address of the communication system component or the destination back to the wireless handset;
   receive at least one response generated and transmitted by one of the communication system components other than the destination; and
   display to the user at the display the communication system component identifier or the network address of the communication system component that generated and transmitted the at least one response.

2. The logic of claim 1, wherein the identified characteristics for each of the wireless access points further comprise a Service Set Identifier associated with the wireless access point.

3. The logic of claim 1, wherein the logic is further operable when executed to order the display of the wireless access point identifiers and the identified characteristics of the wireless access points based on the identified characteristics or one or more other properties of the wireless access points.

4. The logic of claim 3, wherein:
the wireless handset is associated with a Service Set Identifier and an authentication type;
the survey tool is operable to order the access points by:
listing the access point identifier of the access point being used by the wireless handset first;
listing the access point identifiers of any usable access points next, a usable access point comprising an access point that can support a communication session with the wireless handset and that uses the same authentication type and Service Set Identifier as the wireless handset; and
listing the access point identifiers of any remaining access points last.

5. The logic of claim 3, wherein the survey tool is further operable to display the identified characteristics associated with a particular access point in response to a selection initiated by the user of the particular access point in the display.

6. The logic of claim 1, wherein the survey tool is further operable to identify an effective range of the at least one wireless access points using the wireless handset.

7. The logic of claim 6, wherein the survey tool is further operable to identify an overlap area where a signal strength associated with each of two or more of the access points can support a communication session with the wireless handset.

8. The logic of claim 1, wherein the wireless handset comprises an Institute of Electrical and Electronics Engineers (IEEE) 802.11 mobile telephone.

9. An apparatus comprising:
a display;
a memory; and
a processor coupled to the display and the memory and operable to:
receive a first instruction initiated by a user to invoke a survey tool at the apparatus;
invoke execution of the survey tool, the survey tool being operable when executed to:
detect a plurality of wireless access points of one or more communication systems; system; and
identify a plurality of characteristics associated with each of the access points, the identified characteristics for each of the wireless access points comprising a signal strength associated with a communication channel used by the wireless access point and a load placed on the communication channel;
store the identified characteristics of at least one of the wireless access points in the memory; and
display the identified characteristics associated with the at least one wireless access point to the user at the display along with an access point identifier corresponding to the at least one wireless access point;
receive a second instruction initiated by the user to invoke a trace tool at the apparatus;
invoke execution of the trace tool at the apparatus, wherein upon execution of the trace tool, the processor in conjunction with the trace tool is operable to:
receive an address of a destination;
generate a message;
cause the message to be communicated to a particular one of the wireless access points, the message being configured to:
cause the particular one of the wireless access points to route the message to the destination through one or more of the communication systems by way of one or more communication system components; and
cause each of one or more of the communication system components or the destination to generate and transmit a response that comprises a communication system identifier or a network address of the communication system component or the destination back to the apparatus;
receive at least one response generated and transmitted by one of the communication system components other than the destination; and
display to the user at the display the communication system component identifier or the network address of the communication system component that generated and transmitted the at least one response.

10. The apparatus of claim 9, wherein the identified characteristics for each of the wireless access points further comprise a Service Set Identifier associated with the wireless access point.

11. The apparatus of claim 9, wherein:
the wireless handset is associated with a Service Set Identifier and an authentication type; and
the survey tool is operable to cause the process to order the access points by:
listing the access point identifier of the access point being used by the wireless handset first;
listing the access point identifiers of any usable access points next, a usable access point comprising an access point that can support a communication session with the wireless handset and that uses the same authentication type and Service Set Identifier as the wireless handset; and
listing the access point identifiers of any remaining access points last.

12. The apparatus of claim 9, wherein the processor is further operable to order the display of the wireless access point identifiers and the identified characteristics of the wireless access points based on the identified characteristics or one or more other properties of the wireless access points.

13. The apparatus of claim 12, wherein the processor in conjunction with the survey tool is further operable to display the identified characteristics associated with a particular access point in response to a selection initiated by the user of the particular access point in the display.

14. The apparatus of claim 9, wherein the processor in conjunction with the survey tool is further operable to identify an effective range of the at least one wireless access points using the wireless handset.

15. The apparatus of claim 14, wherein the processor in conjunction with the survey tool is further operable to identify an overlap area where a signal strength associated with each of two or more of the access points can support a communication session with the wireless handset.

16. The apparatus of claim 9, wherein the wireless handset comprises an Institute of Electrical and Electronics Engineers (IEEE) 802.11 mobile telephone.

17. A method comprising:
receiving a first instruction initiated by a user to invoke a survey tool at a wireless handset;
invoking execution of the survey tool at the wireless handset;
detecting, by the survey tool, a plurality of wireless access points of one or more communication systems;

identifying, by the survey tool, a plurality of characteristics associated with each of the wireless access points, the identified characteristics for each of the wireless access points comprising a signal strength associated with a communication channel used by the wireless access point and a load placed on the communication channel;

displaying the identified characteristics of at least one of the wireless access points to the user at a display of the wireless handset along with a wireless access point identifier corresponding to the at least one wireless access point;

receiving a second instruction initiated by the user to invoke a trace tool at the wireless handset;

invoking execution of the trace tool at the wireless handset;

receiving, by the trace tool, an address of a destination;

generating, by the trace tool, a message;

causing, by the trace tool, the message to be communicated to a particular one of the wireless access points, the message being configured to:

cause the particular one of the wireless access points to route the message to the destination through one or more of the communication systems by way of one or more communication system components; and cause each of one or more of the communication system components or the destination to generate and transmit a response that comprises a communication system component identifier or a network address of the communication system component or the destination back to the wireless handset;

receiving, by the trace tool, at least one response generated and transmitted by one of the communication system components other than the destination; and displaying to the user at the display the communication system component identifier or the network address of the communication system component that generated and transmitted the at least one response.

18. The method of claim 17, wherein the identified characteristics for each of the wireless access points further comprise a Service Set Identifier associated with the wireless access point.

19. The method of claim 17, further comprising wireless access point identifiers and the identified characteristics of the wireless access points based on the identified characteristics or one or more other properties of the wireless access points.

20. The method of claim 19, wherein:

the wireless handset is associated with a Service Set Identifier and an authentication type; and the survey tool is operable to order the wireless access points by:

listing the access point identifier of the wireless access point being used by the wireless handset first;

listing the access point identifiers of any usable wireless access points next, a usable wireless access point comprising a wireless access point that can support a communication session with the wireless handset and that uses the same authentication type and Service Set Identifier as the wireless handset; and listing the access point identifiers of any remaining wireless access points last.

21. The method of claim 19, wherein the survey tool is further operable to display the identified characteristics associated with a particular wireless access point in response to a selection initiated by the user of the particular wireless access point in the display.

22. The method of claim 17, further comprising identifying, by the survey tool, an effective range of the at least one wireless access points using the wireless handset.

23. The method of claim 22, further comprising identifying, by the survey tool, an overlap area where a signal strength associated with each of two or more of the wireless access points can support a communication session with the wireless handset.

24. The method of claim 17, wherein the wireless handset comprises an Institute of Electrical and Electronics Engineers (IEEE) 802.11 mobile telephone.

25. A wireless handset, comprising:

means for receiving a first instruction initiated by a user;

means for detecting, in response to the first instruction, a plurality of wireless access points of one or more communication systems;

means for identifying a plurality of characteristics associated with each of the wireless access points, the identified characteristics for each of the wireless access points comprising a signal strength associated with a communication channel used by the wireless access point and a load placed on the communication channel; and means for displaying the identified characteristics of at least one of the wireless access points to the user at a display of the handset along with a wireless access point identifier corresponding to the at least one wireless access point;

means for receiving a second instruction initiated by the user;

means for receiving, in response to the second instruction, an address of a destination;

means for generating a message;

means for causing the message to be communicated to a particular one of the wireless access points, the message being configured to:

cause the particular one of the wireless access points to route the message to the destination through one or more of the communication systems by way of one or more communication systems components; and cause each of one or more of the communication systems components or the destination to generate and transmit a response that comprises a communication system component identifier or a network address of the communication system component or the destination back to the wireless handset;

means for receiving at least one response generated and transmitted by one of the communication system components other than the destination; and means for displaying to the user at the display the communication system component identifier or the network address of the communication system component that generated and transmitted the at least one response.

* * * * *